Patented May 31, 1938

2,119,507

UNITED STATES PATENT OFFICE 2,119,507

RESIN COMPOSITION

Percy Morgan Clark, Parlin, N. J., assignor to E. I. du Pont de Nemours & Company, Wilmington, Del., a corporation of Delaware No Drawing. Application May 16, 1935,
Serial No. 21,907

10 Claims. (Cl. 106—23)

This invention relates to the manufacture of resinous materials and more particularly to an improved artificial resin composition containing resinous material derived from rubber.

Various resinous rubber derivatives are known which are more or less useful as thermoplastic materials, ingredients of varnishes and lacquers and like uses common to materials known as "resins". Such "rubber resins" include halogenated or partially halogenated rubbers, rubber hydrohalides and other rubber derivatives, for example, those described in U. S. Patents 1,377,152, 1,797,188, 1,846,247 and 1,853,334. A specific example of such resinous rubber derivatives is the product sold by the Goodyear Tire and Rubber Company of Akron, Ohio, under the trade name "Pliolite", which material may be dissolved in various solvents, e. g. toluol, to prepare varnishes, films or for other useful purposes.

An object of the present invention is to provide improved compositions which contain resinous materials derived from rubber. Other objects will be apparent from the following description of my invention.

I have discovered that the properties of resinous rubber compositions may be improved by intimately mixing therein a resinous material obtained by polymerizing certain partially hydrogenated polycyclic aromatic hydrocarbons. The materials that I have found suitable for this purpose are those described and claimed in the copending application S. N. 736,960 by N. D. Scott and J. F. Walker. These materials may be prepared in accordance with one method as described in the Scott and Walker application by reacting an alkali metal with a polycyclic aromatic hydrocarbon in a suitable solvent ether, whereby an alkali metal addition product of the hydrocarbon is formed in the solution. The solution then is reacted with water or acid, whereby the addition product is converted to the corresponding dihydro derivative of the hydrocarbon. For example, the sodium addition products of naphthalene prepared by this method may be converted to dihydronaphthalene. By subjecting the dihydro compound to the action of a further quantity of the alkali metal addition product, the dihydro compound is polymerized, forming a relatively low melting, somewhat brittle, resinous material which may be recovered by distilling volatiles therefrom. With proper precautions the material may be made in a substantially colorless form, having a slight fluorescence. The following example illustrates more specifically one method of preparing such polymerized material in accordance with the Scott and Walker method.

Example 1

One mole of naphthalene was reacted under an atmosphere of nitrogen with one gram atom of sodium in diethyl glycol ether at room temperature. After the reaction was complete, sufficient water was added to decolorize the solution and the resulting mixture was filtered to remove precipitated sodium hydroxide. The filtrate was then reacted under an atmosphere of nitrogen with a further gram atom of sodium and the resulting mixture was hydrolyzed and filtered and then reacted with a further quantity of sodium and hydrolyzed and filtered as above. The final product was distilled under a pressure of 1 to 3 millimeters until substantially all volatile materials were distilled over. The residue which was equivalent to 85% of the naphthalene originally taken, was a substantially colorless, transparent, slightly fluorescent solid, melting at about 100° C. and having a molecular weight of about 400.

The product of Example 1 is termed herein "dihydronaphthalene polymer". Similar hydrocarbon polymers may be made by this method from other polycyclic aromatic hydrocarbons such as acenaphthene and/or the naphthalene homologues, e. g., methyl naphthalene and the like. Among the various solvent ethers suitable for reacting the hydrocarbons with sodium by this method are: dimethyl ether, methyl ethyl ether, various poly ethers such as the dialkyl glycol ethers and fully alkylated glycerols and cyclic ethers, e. g., dioxane.

The above described polymers also may be made by first preparing the dihydro derivative of a polycyclic aromatic hydrocarbon by any suitable known method and then subjecting it to the polymerizing action of a solution of the sodium addition compound of the same or a different polycyclic aromatic hydrocarbon, in accordance with the aforesaid Scott and Walker method.

In order to practice my invention I incorporate any of the aforementioned polymers of partially hydrogenated hydrocarbons with a rubber resin by any suitable means. By the terms "rubber resin", "resinous rubber derivative" as used herein, I mean the various resin-like substances prepared from rubber or rubber latex by chemical operations, as exemplified by the products described in U. S. Patents 1,377,152; 1,797,188; 1,846,247 and 1,853,334, including the above mentioned material known as "Pliolite", and the "Plioform" resins described by Thies and Clifford in Industrial and Engineering Chemistry, vol. 26, pages 123–129 (February, 1934), which are obtained by reacting rubber or a rubber solution with a halide salt or halogenated acid of a metallic element having a plurality of secondary valences, such as tin tetrachloride, chlorostannic acid, boron trifluoride, fluoboric acid, titanium tetrachloride, ferric chloride, antimony pentachloride, antimony trichloride and the like. For the purpose of the present invention and in the above definition, boron is considered as a metallic element. The "Plioform" resin made by the reaction with the above named tin compounds are especially well adapted for my invention. Preferably I dissolve the rubber resin and the hydrocarbon polymer together in a common solvent and then evaporate the solvent to recover solid resinous material which comprises an intimate mixture of the rubber resin and the hydrocarbon polymer. My invention also comprises solutions containing rubber resin and the aforesaid hydrocarbon polymers, these being useful for the production of film or as coatings for paper, wood, metal and other materials and other valuable uses. The aforesaid hydrocarbon polymers are soluble in many of the solvents for rubber, resinous rubber derivatives and the like, although they are not soluble in water and generally are insoluble in alcohols. More specifically, the herein described dihydronaphthalene polymer, which may be considered typical of the polymers of partially hydrogenated polycyclic aromatic hydrocarbons, is soluble in: (1) hydrocarbon solvents, e. g. benzene, toluene, xylene, tetralin, light petroleum fractions and the like (2) various chlorinated hydrocarbons, e. g., trichlorethylene or chloroform, (3) various ethers and poly ethers, e. g., diethyl ether and other dialkyl ethers, dialkyl glycol ethers, fully alkylated glycerols, and others, (4) esters, such as ethyl acetate, and (5) miscellaneous solvents such as carbon disulfide, turpentine or acetone. This polymer also may be emulsified readily with such materials as glycerol, ethylene glycol, mineral oils and triethanolamine; and my invention includes such emulsions which contain material amounts of resinous material derived from rubber. Solutions and other compositions containing rubber resins and the herein described hydrocarbon polymers made according to my invention may also contain various plasticizers or softening agents such as tricresyl phosphate or dibutyl phthalate, in addition to dyes, pigments, fillers or other ingredients, as desired.

My invention may be further illustrated by the following examples:

Example 2

Solutions of the dihydronaphthalene polymer described in Example 1, were made using xylene and trichlorethylene, respectively, as solvents. Xylene and trichlorethylene solutions also were made of the following resinous rubber derivatives:

A. "Alloprene", a chlorinated rubber produced by the Imperial Chemical Industries, Ltd. of London, England.

B. Rubber hydrochloride, prepared by treating pale crepe rubber with hydrogen chloride in chloroform solution in the presence of phenyl hydrozine.

C. The product obtained by treating rubber with stannic chloride, according to the method of U. S. Patent 1,846,247.

Various combinations were made by mixing the dihydronaphthalene solutions with the solutions of the rubber derivatives, as shown below. Films then were prepared from the mixed solutions by spreading the solutions on smooth steel sheets and allowing the solvents to evaporate. Films also were made from solutions containing only the rubber derivatives. The various solutions thus used to prepare films are tabulated below:

| Percent of solvent | Percent of dihydronaphthalene Polymer | Percent of rubber derivative |
|---|---|---|
| Xylene, 81.2 | 14.1 | Alloprene, 4.7. |
| Xylene, 63.4 | 3.3 | Alloprene, 13.3 |
| Xylene, 83.3 | 1.7 | Alloprene, 15.0. |
| Trichlorethylene, 83.6 | 12.3 | Alloprene, 4.1. |
| Trichlorethylene, 87.9 | None | Alloprene, 12.1. |
| Xylene, 80.8 | None | Alloprene, 19.2. |
| Xylene, 82.8 | 12.9 | Rubber hydrochloride, 4.3. |
| Xylene, 90.9 | 0.9 | Rubber hydrochloride, 8.2. |
| Xylene, 90.9 | 1.8 | Rubber hydrochloride, 7.3. |
| Trichlorethylene, 85.5 | 10.9 | Rubber hydrochloride, 3.6. |
| Trichlorethylene, 91.3 | None | Rubber hydrochloride, 8.7. |
| Xylene, 86.1 | None | Rubber hydrochloride, 13.9. |
| Xylene, 81.1 | 14.2 | Product of U. S. P. 1,846,247, 4.7. |
| Trichlorethylene, 83.6 | 12.3 | Product of U. S. P. 1,846,247, 3.6. |
| Trichlorethylene, 87.9 | None | Product of U. S. P. 1,846,247, 12.1. |
| Xylene, 80.8 | None | Product of U. S. P. 1,846,247, 19.2. |

It was found that the films containing the dihydronaphthalene polymer had a better lustre and smoother surface, were harder and adhered better to the steel sheet than the films made from the rubber derivatives alone.

Example 3

A number of films were made by preparing solutions containing 8 parts of "Pliolite" and 2 parts of dihydronaphthalene polymer and spreading the solutions on glass plates. Tricresyl phosphate and dibutyl phthalate were added to certain of the solutions to serve as plasticizers. Films also were made from dihydronaphthalene polymer alone. It was found that the films containing both "Pliolite" and dihydronaphthalene polymer were harder and adhered to the glass better than the films made of "Pliolite" alone. Also, these films had greater toughness than the films prepared from the dihydronaphthalene polymer alone.

In another experiment, samples of glassine paper were coated by treating with (a) "Pliolite" solution and (b) a solution of 8 parts of "Pliolite" and 2 parts of dihydronaphthalene polymer and allowing the solvent to evaporate. The paper thus coated with the "Pliolite"-dihydronaphthalene polymer mixture was markedly more transparent and the film adhered to the paper better than in the samples of paper coated with "Pliolite" alone.

Example 4

The following are dissolved in toluene to make up a solution containing 10 to 40% of total solids:—

| | Parts by weight |
|---|---|
| "Plioform" resin | 70 to 80 |
| Dihydronaphthalene polymer | 15 to 20 |
| Paraffin wax (60–61° C. melting point) | 2 to 4 |

The solution is coated onto a sheet of regenerated cellulose and the coated sheet is dried at 85 to 95° C. By properly adjusting the proportions of the above named ingredients the coated sheets are obtained which are transparent, flexible and moistureproof.

By means of my invention, various compositions containing the herein described hydrocarbon polymers and rubber resins, with or without plasticizers, softening agents, waxes, fillers, pigments, dyes and the like which are useful for a variety of purposes. By the employment of suitable solvents, liquid compositions may be made which are useful as varnishes, adhesives or coating compositions. Such liquid compositions may be coated on paper, fabric or regenerated cellulose sheets to produce useful articles. Among the substantially non-fibrous and preferably transparent sheet materials to which these compositions may be applied successfully as coatings may be mentioned those which may be precipitated from aqueous cellulosic dispersions including alkali soluble cellulose ethers as lowly substituted methyl or ethyl cellulose, cellulose hydroxy ethers such as glycol cellulose, cellulose carboxy ethers such as lowly substituted cellulose glycollic acid as well as regenerated cellulose. In addition, other cellulosic materials such as cellulose ethers including ethyl or benzyl cellulose, cellulose esters including cellulose acetate or sheets or films of albuminous materials such as gelatin, agar-agar or the like are also contemplated. By incorporating paraffin wax or the like, such coatings may be made substantially moistureproof, as well as flexible and transparent. Alternatively, I may apply such coatings without the aid of solvents, by coating or impregnating the sheet material with a molten composition containing rubber resin and hydrocarbon polymer, with or without plasticizers. My invention is well adapted for placing an adherent, flexible, transparent, moistureproof coating on sheets of regenerated cellulose; in such adaptation, I prefer to incorporate a plasticizing material in the coating composition.

Also, my novel compositions may be formed into flexible films or sheets, which may be transparent and/or moistureproof by known methods, for example by coating a smooth surface with the solution, evaporating the solvent and stripping the resulting film from the smooth surface. Likewise, my novel compositions may be used as thermoplastic materials and molded with the aid of heat into a variety of useful forms.

While various polymers of dihydronaphthalene and dihydronaphthalene homologues may be utilized as the resin constituent in practicing the herein described invention, I prefer to employ the resinous polymers having molecular weights of not less than 400, and particularly the resin described in Example 1, which apparently is a polymer or mixture of polymers of 1,4-dihydronaphthalene.

I claim:

1. A composition of matter comprising a polymer of a dihydrogenated aromatic polycyclic aromatic hydrocarbon and a resinous rubber derivative obtainable by reacting rubber with a compound selected from the group consisting of halogens, hydrogen halides and amphoteric metal halides.

2. A composition of matter comprising dihydronaphthalene polymer and a resinous rubber derivative obtainable by reacting rubber with a compound selected from the group consisting of halogens, hydrogen halides and amphoteric metal halides.

3. A composition of matter comprising dihydronaphthalene polymer and a resinous rubber product obtainable by reacting rubber with an amphoteric metal halide.

4. A composition of matter comprising a polymer of dihydrogenated polycyclic aromatic hydrocarbon, a resinous rubber derivative obtainable by reacting rubber with a compound selected from the group consisting of halogens, hydrogen halides and amphoteric metal halides, and an emulsifying agent selected from the group consisting of mineral oils, glycerol, ethylene glycol and triethanolamine.

5. A composition of matter comprising a polymer of a dihydrogenated polycyclic aromatic hydrocarbon, a resinous rubber derivative obtainable by reacting rubber with a compound selected from the group consisting of halogens, hydrogen halides and amphoteric metal halides, and a solvent comprising a liquid selected from the group consisting of hydrocarbons, chlorinated hydrocarbons, ethers, carbon disulfide, turpentine and acetone.

6. A composition of matter comprising dihydronaphthalene polymer, a resinous rubber product obtainable by reacting rubber with an amphoteric metal halide and an emulsifying agent selected from the group consisting of mineral oils, glycerol, ethylene glycol and triethanolamine.

7. A composition of matter comprising dihydronaphthalene polymer, a resinous rubber product obtainable by reacting rubber with a compound selected from the group consisting of halogens, hydrogen halides, and amphoteric metal halides, and a solvent consisting of a liquid selected from the group consisting of hydrocarbons, chlorinated hydrocarbons, ethers, carbon disulfide, turpentine and acetone.

8. A composition of matter comprising dihydronaphthalene polymer, a resinous rubber product obtainable by reacting rubber with an amphoteric metal halide and a solvent comprising a liquid hydrocarbon.

9. A composition of matter comprising dihydronaphthalene polymer, a resinous rubber product obtainable by reacting rubber with an amphoteric metal halide and a solvent comprising a liquid chlorinated hydrocarbon.

10. A composition of matter comprising dihydronaphthalene polymer, a resinous rubber product obtainable by reacting rubber with an amphoteric metal halide and a solvent comprising an ether.

PERCY MORGAN CLARK.